United States Patent [19]
Kokubu et al.

[11] Patent Number: 5,556,348
[45] Date of Patent: Sep. 17, 1996

[54] TOROIDAL-TYPE CONTINUOUSLY VARIABLE TRANSMISSION

[75] Inventors: Hideki Kokubu; Tsutomu Abe; Hisashi Machida, all of Kanagawa, Japan

[73] Assignee: NSK Ltd., Tokyo, Japan

[21] Appl. No.: 296,922

[22] Filed: Aug. 31, 1994

[30] Foreign Application Priority Data

Aug. 31, 1993 [JP] Japan .................................. 5-238710

[51] Int. Cl.$^6$ .............................. F16H 15/38; F16C 33/00; C23C 8/22
[52] U.S. Cl. .......................... 476/40; 148/319; 384/625; 384/907.1; 476/73
[58] Field of Search ..................... 384/492, 625, 384/907.1; 148/319, 906; 476/40, 73

[56] References Cited

U.S. PATENT DOCUMENTS

| | | | |
|---|---|---|---|
| 4,916,981 | 4/1990 | Suzuki et al. | 475/183 |
| 5,030,017 | 7/1991 | Murakami et al. | 384/625 X |
| 5,084,116 | 1/1992 | Mitamura | 384/625 X |
| 5,122,000 | 6/1992 | Matsumoto et al. | 384/625 X |

FOREIGN PATENT DOCUMENTS

| | | |
|---|---|---|
| 63-203955 | 8/1988 | Japan . |
| 2-49411 | 12/1990 | Japan . |
| 759773 | 10/1956 | United Kingdom . |

OTHER PUBLICATIONS

"Heat Treatment of Steels" (Revised Fifth Edition), The Iron and Steel Institute of Japan, published Jan. 30, 1989.
"Fatigue Life Analysis for Traction Drives With Application to a Toroidal Type Geometry", Coy et al., NASA Technical Note, NASA TN D-8362, Dec. 1976.
Antriebstechnik 22 (1983), No. 1, pp. 35–41.
Stüwe, Einführung in die Werkstofftechnik, Bibliografisches Institut Mannheim, 1969, pp. 95–96.

Primary Examiner—Allan D. Herrmann
Attorney, Agent, or Firm—Sughrue, Mion, Zinn, Macpeak & Seas

[57] ABSTRACT

A toroidal-type continuously variable transmission provides an input side disk disposed on an input shaft, an output side disk disposed on an output shaft, and a power roller for transmitting motive power of the input shaft to the output shaft while engaging both the input side disk and the output side disk, in which the input side disk, the output side disk, and the power roller made of a material are subjected to either a carburizing and grinding process or to a carbonitriding and grinding process so that effective carburized depths of the input side disk, the output side disk, and the power roller are limited to a range between 2.0 mm and 4.0 mm. The toroidal-type continuously variable transmission is capable of improving not only the rolling contact lives of the traction surfaces of the input and output side disks as well as the traction surfaces of the power rollers, but also the fatigue fracture lives of the input and output side disks and power rollers.

9 Claims, 4 Drawing Sheets

TOROIDAL-TYPE CONTINUOUSLY VARIABLE TRANSMISSION

BACKGROUND OF THE INVENTION

The present invention relates to an improvement of a toroidal-type continuously variable transmission used in vehicles such as automobiles.

Figure 6:
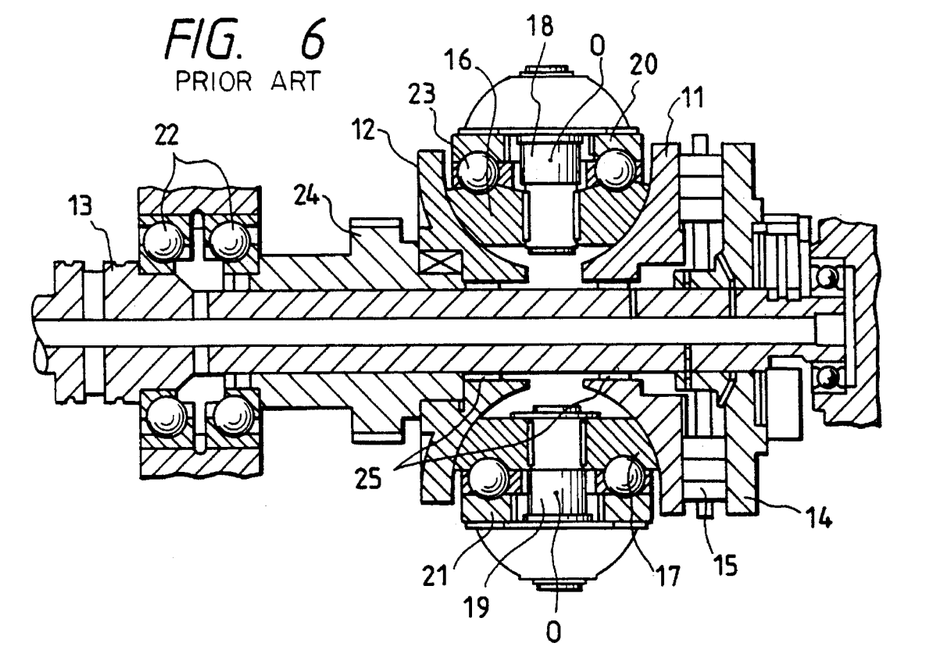
FIG. 6 is a section diagram showing the construction of a part of a toroidal-type continuously variable transmission to which the present invention is applied.

A conventional toroidal-type continuously variable transmission is, as shown, e.g., in FIG. 6, constructed so that an input side disk 11 and an output side disk 12 are coaxially disposed so as to be opposed to each other inside a housing (not shown). An input shaft 13 passes through the shaft center of the toroidal transmission section having the input side disk and the output side disk. A loading cam 14 is disposed on an end of the input shaft 13. The loading cam 14 transmits the motive power (rotational force) of the input shaft 13 to the input side disk 11 through a cam roller 15.

The input side disk 11 and the output side disk 12, having substantially the same shape, are disposed so as to be symmetrical, and formed so as to be substantially semicircular in section as viewed in the axial direction with both opposed surfaces thereof taken into view. A pair of power rollers 16 and 17 that transmit motion are disposed so as to be in contact with the input side disk 11 and the output side disk 12, respectively, within a toroidal cavity formed by the toroidal surfaces of the input side disk 11 and the output side disk 12. Reference numeral 23 designates a thrust bearing.

In this case, the power rollers 16 and 17 are pivotably attached to trunnions 20 and 21 through pivots 18 and 19, and pivotably supported with a pivot O as the center, the pivot O serving as the center of the toroidal surface of the input side disk 11 and the output side disk 12. The surfaces of contact among the input side disk 11, the output side disk 12, and the power rollers 16 and 17 are supplied with a lubricating oil whose viscous frictional resistance is large, so that the motive power applied to the input side disk 11 is transmitted to the output side disk 12 through the lubricating oil film and the power rollers 16 and 17.

The input side disk 11 and the output side disk 12 are independent of the input shaft 13 (not being directly affected by the motive power of the input shaft 13) through needles 25. An output shaft 24 is attached to the output side disk 12. The output shaft extends in parallel with the input shaft 13 and is rotatably supported by the housing through an angular bearing 22.

In this toroidal-type continuously variable transmission the motive power of the input shaft 13 is transmitted to the loading cam 14. When the loading cam 14 is rotated by the transmission of the motive power, this rotational power is transmitted to the input side disk 11 through the cam roller 15, which in turn causes the input side disk 11 to rotate. The motive power generated by the rotation of the input side disk 11 is transmitted to the output side disk 12 through the power rollers 16 and 17. The output side disk 12 rotates integrally with the output shaft 24.

At the time of changing the speed, the two trunnions 20 and 21 are slightly moved toward the pivot O. That is, the axial movement of the trunnions 20 and 21 releases the intersection between the rotating shaft of the power rollers 16 and 17 and the shafts of the input side disk 11 and the output side disk 12. As a result, the power rollers 16 and 17 oscillate over the surfaces of the input side disk 11 and the output side disk 12, thereby changing the speed ratio to either accelerate or decelerate the motor vehicle.

Such a toroidal-type continuously variable transmission is disclosed, e.g., in Unexamined Japanese Patent Publication No. Sho. 63-203955 and Examined Japanese Utility Model Publication No. Hei. 2-49411. As conventional examples of the above-mentioned input side disk, output side disk, and power rollers, those using AISI52100 (equivalent of JIS SUJ2 high carbon chromium bearing steel) are known (see NASA Technical note, NASA ATN D-8362).

When driven, the above-mentioned toroidal-type continuously variable transmission generates among the input side disk, the output side disk, and the power rollers such a high contact stress as to reach a maximum contact stress of, e.g., about 4 GPa, which is so high a load as not to be received by usual rolling bearings and which is an inherent phenomenon in the toroidal-type continuously variable transmission. Therefore, there exists a problem in that the traction surfaces of the input and output side disks as well as the traction surfaces of the power rollers are susceptible to flaking. In addition, the bearing surfaces of the power rollers are put under a high contact stress, also causing such surfaces to flake in some cases.

To overcome this problem, efforts to prevent the flaking and fracture of the traction surfaces in the toroidal surface formed by the input and output side disks as well as the traction surfaces of the power rollers and to improve the reliability of these parts are called for.

Since the input side disk, the output side disk, and the power rollers are subject to repetitive bending stress, fatigue fracture tends to occur at these parts. Therefore, an improvement in fatigue strength under bending stress is also called for.

However, input and output side disks and power rollers for the conventional toroidal-type continuously variable transmission which satisfy the reliability of the traction surfaces and the bending stress life have not been achieved. That is, there is a need for studying not only the material of which the input side disk, the output side disk, and the power rollers are made, but also the heat treatment to be applied to such material.

SUMMARY OF THE INVENTION

The present invention has been made to overcome these conventional problems. Accordingly, the object of the present invention is to provide a toroidal-type continuously variable transmission in which rolling contact fatigue lives of the traction surfaces of the input and output side disks as well as the traction surfaces of the power rollers are improved, and in which the fatigue fracture strengths of the input and output side disks and power rollers are improved.

To achieve the above object, the present invention is applied to a toroidal-type continuously variable transmission that includes: an input side disk disposed on an input shaft; an output side disk disposed on an output shaft; and a power roller for transmitting motive power of the input shaft to the output shaft while engaging both the input and output side disks, in which the input side disk, the output side disk, and the power roller made of a material are subjected to either a carburizing and grinding process or to a carbonitriding and grinding process so that effective carburized depths of the input and output side disks and power roller are limited to a range between 2.0 mm and 4.0 mm.

By the term "effective carburized depth" herein used is meant the depth from a case whose Vickers hardness is 550 HV or more.

The input side disk, the output side disk, and the power rollers that constitute the toroidal-type continuously variable transmission of the present invention are either subjected to the carburizing and grinding process or subjected to the carbonitriding and grinding process, so that the effective carburized depths of these input and output side disks and power rollers are limited to a range between 2.0 mm and 4.0 mm. As a result, not only the rolling contact fatigue lives of the traction surfaces in the toroidal surface formed by the input and output side disks as well as of the traction surfaces of the power rollers can be improved, but also the fatigue fracture strengths of the input and output side disks and power rollers can be improved.

DETAILED DESCRIPTION OF THE PREFERRED EMBODIMENTS

Since the basic construction of a toroidal-type continuously variable transmission of the present invention is the same as that of the conventional example (shown in FIG. 6), the description thereof will be omitted.

In the toroidal-type continuously variable transmission of the present invention, when input and output side disks have been subjected to the carburizing or carbonitriding process and then to the grinding process to limit effective carburized depths thereof to a range between 2.0 mm and 4.0 mm, flaking and fatigue fracture strength of traction surfaces of the input and output side disks can be improved. The reasons therefor will be described below.

When the effective carburized depths of the input and output side disks are less than 2.0 mm, the traction surfaces of the input and output side disks start flaking soon after the toroidal-type continuously variable transmission have been driven. This is because each traction surface is subject to rolling contact fatigue under a high contact stress, which decreases the safety factor of the strength at the depth with respect to the maximum shearing stress, thereby causing the rolling contact fatigue life to decrease.

Figure 7:
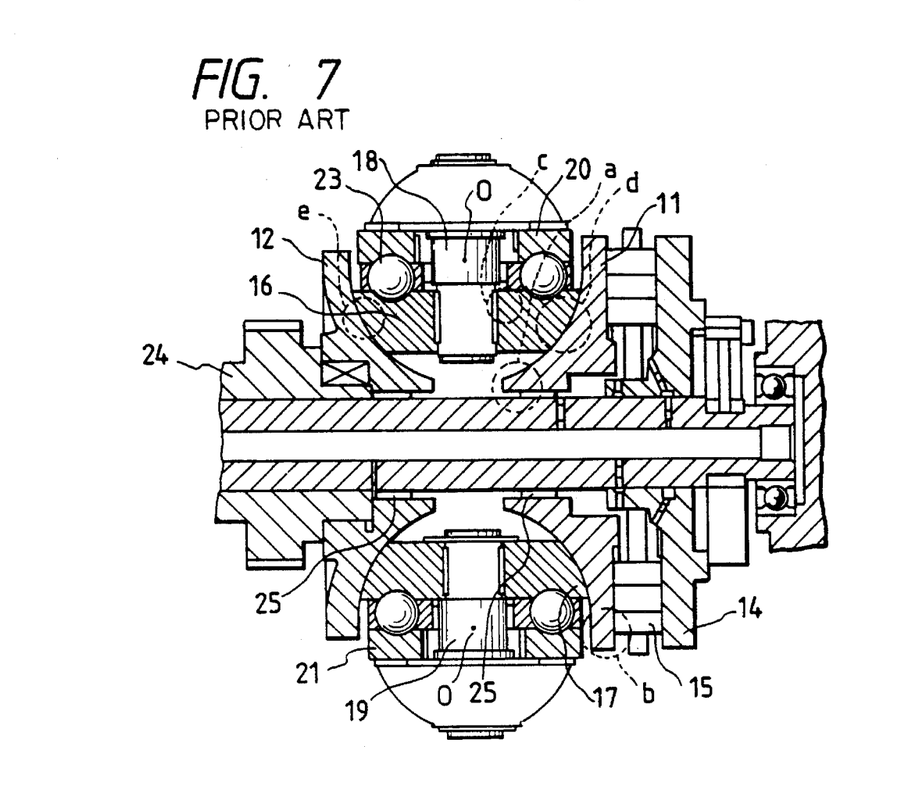
FIG. 7 is a partially enlarged view of FIG. 6.

On the other hand, when the effective carburized depths of the input and output side disks exceed 4.0 mm, fatigue fracture is produced at portions designated by "a" and "b" in FIG. 7. This is because the hardness in each cores of these portions "a" and "b" is increased.

FIG. 7 is a partially enlarged view of FIG. 6. The portions "a" and "b" are those receiving the repetitive stress most when the toroidal-type continuously variable transmission is in operation. These portions have complicated shapes and have the edges thereof which are unground surfaces (as heat treated), so that these portions also have layers with abnormal carburization such as intergranular oxidation, exhibiting a tendency toward reduced fatigue fracture strength due to stress concentration.

Further, when the power roller is subjected to carburizing or carbonitriding process and then to the grinding process to limit the effective carburized depth thereof to a range between 2.0 mm and 4.0 mm, flaking and fatigue fracture strength of the traction surface of the power roller can be improved.

When the effective carburized depth of the power roller is less than 2.0 mm, the traction surface of the power roller starts flaking soon after the toroidal-type continuously variable transmission have been driven. This is because the traction surface of the power roller is subject to rolling contact fatigue under a high contact stress, which decreases the safety factor of the strength at the depth with respect to the maximum shearing stress, thereby causing the rolling contact fatigue life to decrease.

On the other hand, when the effective carburized depth of the power roller exceeds 4.0 mm, fatigue fracture is produced at a portion designated by "c" in FIG. 7. This is because the edge of this portion "c" has been the unground surface (as heat treated), so that such portion not only includes layers with abnormal carburization such as intergranular oxidation, but also is so thin that the hardness in the core thereof is increased to reduce the fatigue strength.

Improvement in the rolling contact fatigue lives of the traction surfaces of the input and output side disks and the traction surface of the power roller, as well as improvement in the fatigue fracture strengths of the input and output side disks and power roller can be achieved as long as the effective carburized depths of the input and output side disks and power roller are limited to a range between 2.0 mm and 4.0 mm.

These effective carburized depths (between 2.0 mm and 4.0 mm) can be obtained by subjecting a material to a carburizing or carbonitriding process.

Therefore, the input and output side disks and power roller were subjected to the carburizing or carbonitriding process and then to the grinding process to limit the effective carburized depths of both side disks and power roller to a range between 2.0 and 4.0 mm.

The material of which the input and output side disks and power roller are made contains: silicon (Si) within the range between 0.05 wt % and 0.2 wt %; and manganese within the range of 0.2 wt % and 0.7 wt %, so that intergranular oxidation can be reduced. That is, the depth of an intergranular oxide layer is made thinner to reduce stress concentration at such layer. Therefore, fatigue fracture strength can be further improved.

Smaller contents of silicon and manganese in the material are more preferable. However, the material of which the input and output side disks and power roller are made inevitably contains about 0.05 wt % of silicon.

If the content of manganese in the material of which the input and output side disks and power roller are made is reduced to less than 0.2 wt %, it is too costly to manufacture input and output side disks and power rollers under the present steel-making technology.

On the other hand, if the content of silicon in the material of which the input and output side disks and power roller are made exceeds 0.2 wt %, intergranular oxidation tends to occur easily, thereby making the depth of the intergranular oxide layer deep. As a result, stress concentration occurs at the intergranular oxide layer, causing fatigue fracture strength to be reduced.

If the content of manganese in the material of which the input and output side disks and power roller are made exceeds 0.7 wt %, intergranular oxidation tends to occur easily, thereby making the depth of the intergranular oxide layer deep. As a result, stress concentration occurs at the intergranular oxide layer, causing fatigue fracture strength to be reduced.

Therefore, it is more preferable to use a material that contains silicon within the range between 0.5 wt % and 0.2 wt % and manganese within the range between 0.2 wt % and 0.7 wt %.

It is also more preferable to limit the peak of the residual compressive stress to a range between $-130$ Kgf/mm$^2$ and $-60$ Kgf/mm$^2$ within 0.15 mm in depth from the surfaces of the input and output side disks and power roller. Accordingly, a further stable fatigue fracture strength can be obtained.

This residual compressive stress can be obtained by, e.g., a shot peening process. The shot peening process is advantageous in imparting surface hardness and residual compressive stress to an object to be processed.

With respect to the residual compressive stress, the tensile strength is designated by (+) and compressive strength is designated by (−) in the present invention.

To obtain an effective carburized depth whose hardness in Vickers scale is 550 HV or more, it is preferable to limit the content of base carbon (C) in the material of which the input and output side disks and power roller are machinery made to 0.35 wt% or less as disclosed in, e.g., "Heat Treatment of Steels" (revised fifth edition), the Iron and Steel Institute of Japan, p. 24, FIG. 1–39.

That is, to limit the core to a Vickers hardness of 550 HV or less (Vickers hardness of the portion further within than the effective carburized depth), it is desirable to limit the content of base carbon in the material to 0.35 wt% or less.

When the content of base carbon in the material exceeds 0.35 wt%, the core has a Vickers hardness of 550 HV or more. As a result, not only does the effective carburized depth no longer comply with the present invention, but also fatigue fracture tends to occur easily.

Therefore, it is desirable to limit the content of base carbon in the material to 0.35 wt% or less.

Further, purity of a steel (material) significantly affects the improvement in rotary bending strength and rolling contact fatigue life of a high strength steel. In other words, the presence of a large-sized nonmetallic inclusion in a steel tends to cause fatigue breakage and flaking to develop with the nonmetallic inclusion as an initial point. As a result, it is desirable to improve purity of the material, or more preferably, to control oxygen content in the steel to 10 ppm or less.

Figure 1:
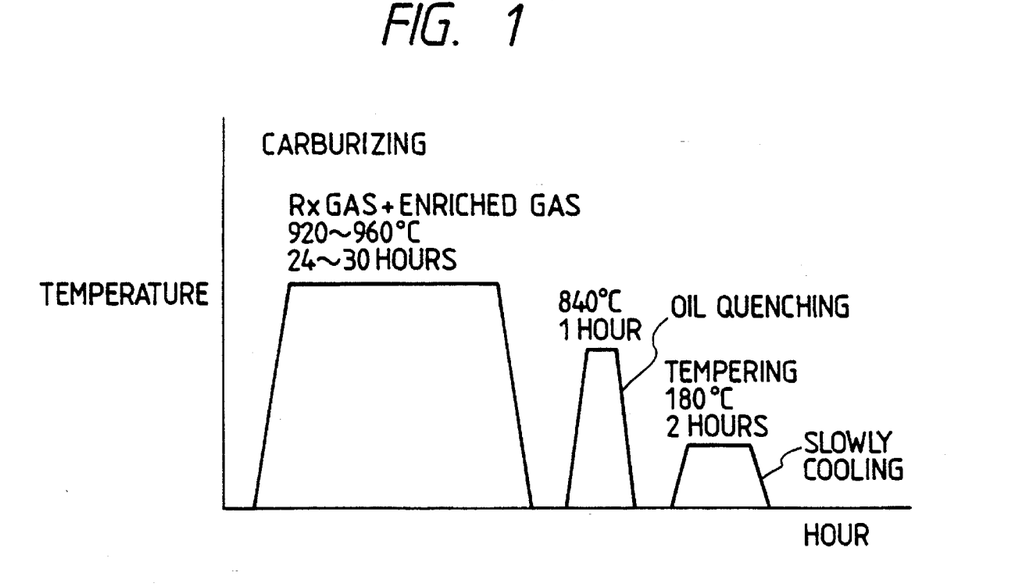
FIG. 1 is a diagram showing a heat treatment, which is a first embodiment of the present invention.
Figure 5:
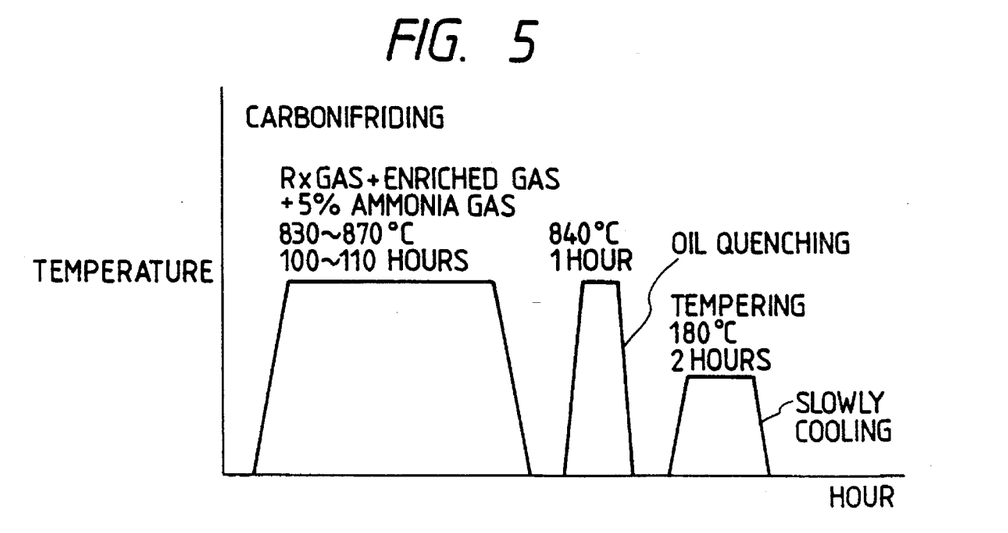
FIG. 5 is a diagram showing a heat treatment, which is a second embodiment of the present invention.

Next, a method of fabricating the input side disk, the output side disk, and the power roller will be described with reference to heat treatments serving as first and second embodiments of the present invention as shown in FIGS. 1 and 5.

The input side disk and the output side disk, both being made of case hardening steel (material) whose chemical composition is as shown in Table 1, are subjected to the heat treatment shown in FIG. 1.

TABLE 1

| Composition (wt %) | | | | | | |
|---|---|---|---|---|---|---|
| C | Si | Mn | Cr | Mo | P | S |
| 0.2 | 0.16 | 0.6 | 1.1 | 0.15 | 0.014 | 0.009 |

The case hardening steel whose chemical composition is as shown in Table 1 is subjected to a carburizing process under the following conditions.

Carburizing Conditions

Atmosphere: Rx gas and enriched gas
Carburizing temperature: Within the range 920° to 960° C. (930° C. was selected in this embodiment)
Carburizing time: 15 to 50 hours in accordance with the desired effective carburized depth Then, after the carburizing process has been completed, the material was slowly cooled (furnace cooling), and then heated again to 840° C. for an hour. Then, after being subjected to an oil quenching process, the material is continuously tempered at 180° C. for two hours. Then, the material was slowly cooled.

As a result, the surface that has been hardened to a Vickers hardness of about 697 to 772 HV (60 to 63 HRC) can be obtained.

Then, a portion designed to become the traction surfaces of the input and output side disks is subjected to a grinding process (a superfinishing process after grinding).

As a result, the input and output side disks (Examples 1 to 3) whose effective carburized depths are as shown in Table 2 were obtained.

As comparative examples, input and output side disks whose effective carburized depths are as shown in Table 2 were prepared by using a case hardening steel whose chemical composition is as shown in Table 1 while changing the carburizing conditions. The effective carburized depths are: 1.0 mm (Comparative Example 1); 1.5 mm (Comparative Example 2); 4.5 mm (Comparative Example 3); and 5.5 mm (Comparative Example 4).

The conventional method (through hardening) was also employed to prepare input and output side disks by using the conventional bearing steel (JIS SUJ2).

Then, power rollers whose effective carburized depths are 3.0 mm were prepared by using a case hardening steel whose chemical composition is as shown in Table 1 while subjecting the case hardening steel to the same carburizing and grinding process.

Then, toroidal-type continuously variable transmissions shown in FIG. 6 were prepared by using the above-mentioned respective input and output side disks, and power rollers, and the lives of these input and output side disks were tested under the following conditions.

Test Conditions

Number of revolutions of the input shaft: 4000 rpm
Input torque: 392 N·m
Used oil: Synthetic lubricating oil
Oil temperature: 100° C.

The lives of the input and output side disks were determined by the period of time up to when the traction surface starts flaking or by the period of time up to when the input side disk or the output side disk starts having fatigue fracture.

The results of the test are shown in Table 2.

TABLE 2

|  | Effective carburized depth | Service life | Failure |
| --- | --- | --- | --- |
| Example 1 | 2.0 mm | 10.0 hrs.≦ | none |
| Example 2 | 3.0 mm | 10.0 hrs.≦ | none |
| Example 3 | 4.0 mm | 10.0 hrs.≦ | none |
| Comparative Example 1 | 1.0 mm | 3.5 hrs. | Traction surface flaking |
| Comparative Example 2 | 1.5 mm | 4.0 hrs. | Traction surface flaking |
| Comparative Example 3 | 4.5 mm | 6.3 hrs. | Fatigue fracture at portion "a" of disc |
| Comparative Example 4 | 5.5 mm | 3.2 hrs. | Fatigue fracture at portion "b" of disc |
| SUJ-2 (through hardening) |  | ≦3.0 hrs. | Fatigue fracture at portions "a" and "b" of disc |

From Table 2, the input and output side disks (Examples 1 to 3) whose effective carburized depths are from 2.0 mm to 4.0 mm were free from flaking on the traction surfaces thereof and fatigue fracture even if the toroidal-type continuously variable transmissions were operated for more than 10 hours. It is understood from this that the lives of the input and output side disks have been remarkably improved compared with the comparative examples and the conventional SUJ2 example.

On the other hand, it is found that the input and output side disks (Comparative Examples 1 and 2) whose effective carburized depths are 1.0 mm and 1.5 mm were subject to flaking on the traction surfaces thereof at an early stage. The reason for the flaking is that the traction surfaces are subject to rolling contact fatigue under a high contact stress, which decreases the safety factor of the strength at the depth with respect to the maximum shearing stress when the effective carburized depth is thin, and that this reduces rolling contact fatigue life.

It is also verified that the input and output side disks (Comparative Examples 3 and 4) whose effective carburized depths are 4.5 mm and 5.5 mm were subject to fatigue fracture at an early stage at the portions respectively designated by "a" and "b" in FIG. 7. Since these portions are thin, the effective carburized depths were relatively thick, which increases the hardness in the cores of these portions and thereby reduces fatigue fracture strength.

It is also found that the conventional input and output side disks prepared by using the SUJ2 bearing steel was subject to fatigue fracture at the portions designated by "a" and "b" in FIG. 7 at the earliest (within 3 hours).

Then, the power rollers machinery made of a case hardening steel (material) whose chemical composition is as shown in Table 1 is subjected to a heat treatment (see FIG. 1) under the same conditions as described above. As a result, a surface having a Vickers hardness of about 697 to 772 HV (60 to 63 HRC) can be obtained.

The power rollers are then ground in the same way as described above. The power rollers (Examples 4 to 6) whose effective carburized depths are as shown in Table 3 were obtained.

As comparative examples, power rollers whose effective carburized depths are as shown in Table 3 were prepared by using a case hardening steel whose chemical composition is as shown in Table 1 while changing the carburizing conditions. The effective carburized depths are: 1.0 mm (Comparative Example 5); 1.5 mm (Comparative Example 6); 4.5 mm (Comparative Example 7); and 5.5 mm (Comparative Example 8).

Further, power rollers were prepared by the conventional method (through hardening) by using the conventional bearing steel (JIS SUJ2).

Then, power rollers whose effective carburized depths are 3.0 mm were prepared by using a case hardening steel whose chemical composition is as shown in Table 1 and by the same carburizing and grinding process.

Then, toroidal-type continuously variable transmissions shown in FIG. 6 were prepared by using the above-mentioned respective power rollers and input and output side disks, and the lives of the power rollers were tested under the same conditions as described above.

The service life of each power roller was determined by the period of time up to when the traction surface starts flaking or by the period of time up to when the power roller starts having fatigue fracture.

The results of the test are shown in Table 3.

TABLE 3

|  | Effective carburized depth | Service life | Failure |
| --- | --- | --- | --- |
| Example 4 | 2.0 mm | 10.0 hrs.≦ | none |
| Example 5 | 3.0 nm | 10.0 hrs.≦ | none |
| Example 6 | 4.0 mm | 10.0 hrs.≦ | none |
| Comparative Example 5 | 1.0 mm | 6.2 hrs. | Traction surface flaking |
| Comparative Example 6 | 1.5 m | 7.5 hrs. | Traction surface flaking |
| Comparative Example 7 | 4.5 mm | 5.3 hrs. | Fatigue fracture of power roller c portion |
| Comparative Example 8 | 5.5 mm | 4.5 hrs. | Fatigue fracture of power roller c portion |
| SUJ-2 (through hardening) |  | ≦13.0 hrs. | Fatigue fracture of power roller c partion |

From Table 3, the power rollers (Examples 4 to 6) whose effective carburized depths are from 2.0 mm to 4.0 mm were free from flaking on the traction surfaces thereof and fatigue fracture even if the toroidal-type continuously variable transmissions were operated for more than 10 hours. It is understood from this that the lives of these power rollers have been remarkably improved compared with the comparative examples and the conventional SUJ2 example.

On the other hand, it is found that the power rollers (Comparative Examples 5 and 6) whose effective carburized depths are 1.0 mm and 1.5 mm were subject to flaking on the traction surfaces thereof at an early stage. The reason for the flaking is that each traction surface is subject to rolling contact fatigue under a high contact stress, which decreases the safety factor of the strength at the depth with respect to the maximum shearing stress when the effective carburized depth is thin, and that this reduces rolling contact fatigue life.

Further, the power rollers (Comparative Examples 7 and 8) whose effective carburized depths are 4.5 mm and 5.5 mm were subject to fatigue fracture at an early stage at the portion respectively designated by "c" in FIG. 7. This is because the deeper effective carburized depth brings about a reduction in fatigue fracture strength, together with an increase in the core hardness as well as the presence of layers with abnormal carburization such as intergranular oxidation at the edges thereof that are the unground surface (as heat treated).

It is also verified that the conventional power rollers prepared by using the bearing steel SUJ2 were subject to fatigue fracture at the portion designated by "c" in FIG. 7 at the earliest (within 3 hours).

Then, case hardening steels (material Nos. A to I) whose chemical composition is as shown in Table 4 were subjected to a heat treatment (see FIG. 1) under the following conditions, and the depths of the intergranular oxide layers of the obtained carburized steels were tested.

Carburizing Conditions

Atmosphere: Rx gas and enriched gas
Carburizing temperature: 930° C.
Carburizing time: 30 hours The results of the test are shown in Table 4.

Figure 2:
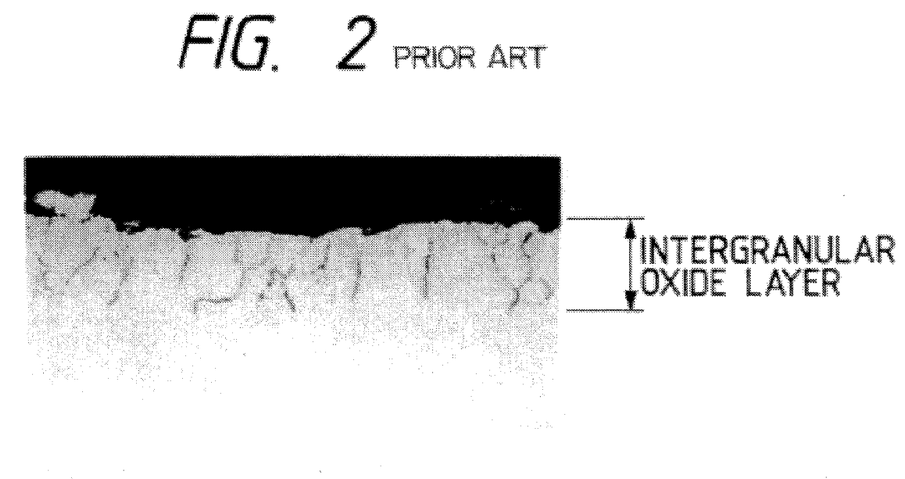
FIG. 2 is a microscopic photograph showing the structure of an intergranular oxide layer formed in a conventional material.

Material No. A designates a conventional case hardening steel. A microscopic photograph showing the structure of an intergranular oxide layer thereof is shown in FIG. 2 (×400).

rollers, and the lives of these input and output side disks were tested under the same conditions as described above.

The results of the test are shown in Table 5 (service life of the non-SP treated product).

TABLE 5

|  | Material No. | Service life of non-SP treated product | Portion of fatigue fracture | Service life of SP-treated product |
|---|---|---|---|---|
| Comparative Example | A | 38 hrs. | Portions "a" and "b" of disc | 60 hrs. |
| Example | B | 100 hrs.≦ | none | 100 hrs.≦ |
|  | C | 100 hrs.≦ | none | 100 hrs.≦ |
|  | D | 100 hrs.K | none | 100 hrs.≦ |
|  | E | 100 hrs.≦ | none | 100 hrs.≦ |
| Comparative Example | F | 55 hrs. 55 hrs. | Portions "a" and "b" of disc | 68 hrs. |
|  | G | 72 hrs. | Portions "a" and "b" of disc | 100 hrs.≦ |
|  | H | 62 hre. | Portions "a" and "b" of disc | 73 hrs. |
|  | I | 75 hrs. | Portions "a" and "b" of disc | 100 hrs.≦ |

TABLE 4

|  | Material No. | Composition (wt %) | | | | | | Intergranular oxide layer |
|---|---|---|---|---|---|---|---|---|
|  |  | C | Si | Mn | Cr | Mo | P | S |  |
| Comparative Example | A | 0.20 | 0.25 | 0.8 | 1.1 | 0.15 | 0.014 | 0.009 | 30 μm |
| Example | B | 0.2 | 0.18 | 0.7 | 1.1 | 0.15 | 0.014 | 0.009 | 10 μm |
|  | C | 0.2 | 0.16 | 0.5 | 1.1 | 0.15 | 0.014 | 0.009 | 10 μm |
|  | D | 0.2 | 0.10 | 0.7 | 1.1 | 0.15 | 0.014 | 0.009 | ≦5 μm |
|  | E | 0.2 | 0.08 | 0.6 | 1.1 | 0.15 | 0.014 | 0.009 | ≦5 μm |
| Comparative Example | F | 0.2 | 0.25 | 0.7 | 1.1 | 0.15 | 0.014 | 0.009 | 25 μm |
|  | G | 0.2 | 0.25 | 0.6 | 1.1 | 0.15 | 0.014 | 0.009 | 15 μm |
|  | H | 0.2 | 0.18 | 0.8 | 1.1 | 0.15 | 0.014 | 0.009 | 25 μm |
|  | I | 0.2 | 0.15 | 0.8 | 1.1 | 0.15 | 0.014 | 0.009 | 15 μm |

It is understood from Table 4 that the depth of the intergranular oxide layer becomes smaller with smaller content of silicon (Si) and manganese (Mn). It is also understood from the comparative examples (Material Nos. F to I) that the depth of the intergranular oxide layer cannot be reduced sufficiently only by decreasing the content of either one of the elements, Si or Mn.

That is, it is verified that the examples (Material Nos. B to E) in which the contents of both silicon and manganese are small exhibit a remarkable decrease in the depth of the intergranular oxide layer compared with the comparative examples (Material No. A).

Then, input side disks, output side disks, and power rollers whose effective carburized depths are 3.0 mm were prepared by subjecting the input and output side disks and power rollers machinery made of case hardening steel shown in Table 4 (Material Nos. A to I) to the same heat treatment (see FIG. 1) and then to the same grinding process as described above.

Then, toroidal-type continuously variable transmissions shown in FIG. 6 were fabricated by using the above-mentioned respective input and output side disks and power Then, the portions designated by "a" and "b" in FIG. 7 of the input and output side disks (after heat treated and ground) were subjected to a shot peening (hereinafter referred to as "SP") process under the following conditions, and toroidal-type continuously variable transmissions shown in FIG. 6 were fabricated. The lives of the input and output side disks (SP treated products) were tested under the same conditions as described above. The results of the test are shown in Table 5 (service life of the SP treated product).

SP Conditions

Figure 3:
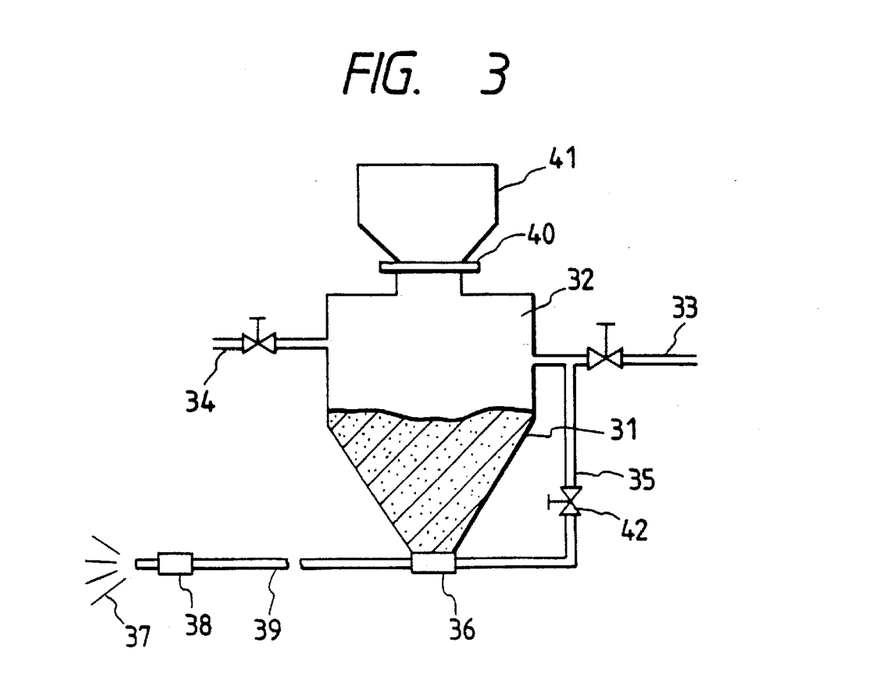
FIG. 3 is a diagram showing the construction of a device used for an SP (shot peening) treatment in the first embodiment of the present invention.

The heat treated and ground input side disk and output side disk were subjected to an SP process using a device shown in FIG. 3 so that compressive residual stresses at portions within 0.15 mm in depth from the surfaces of the input and output side disks peak at −130 to −60 Kgf/mm².

The device shown in FIG. 3 includes: a pressure tank 32 in which shot particles 31 are loaded; an air supply pipe 33 for supplying air to the pressure tank 32; an exhaust pipe 34 for exhausting the air supplied to the pressure tank 32; a mixer 36, arranged below the pressure tank, for mixing compressed air from a manifold 35 of the air supply pipe 33 with the shot particles 31; a hose 39 for injecting shot 37 from a nozzle 38 to the surface of a material to be processed; a hopper 41 for supplying the shot particles 31 to the pressure tank 32 through a shutter 40; and a valve 42, arranged along the manifold 35, for adjusting the air pressure that adjusts the shot particles 31 injecting speed.

In this embodiment, steel balls, each having an average grain diameter of 0.72 mm and an average hardness of 61 HRC, are used as the shot particles 1. The SP process was carried out so that the shot injecting speed ranges from 32 to 120 m/sec (average injection speed=80 m/sec).

The SP process is advantageous in improving surface hardness and imparting compressive residual stress to a material to be processed.

The relationship between the depth from the surface and the compressive residual stress in the input and output side disks in the SP process was tested. Non-SP treated products were also similarly tested. The results of these tests are shown in FIG. 4.

Figure 4:
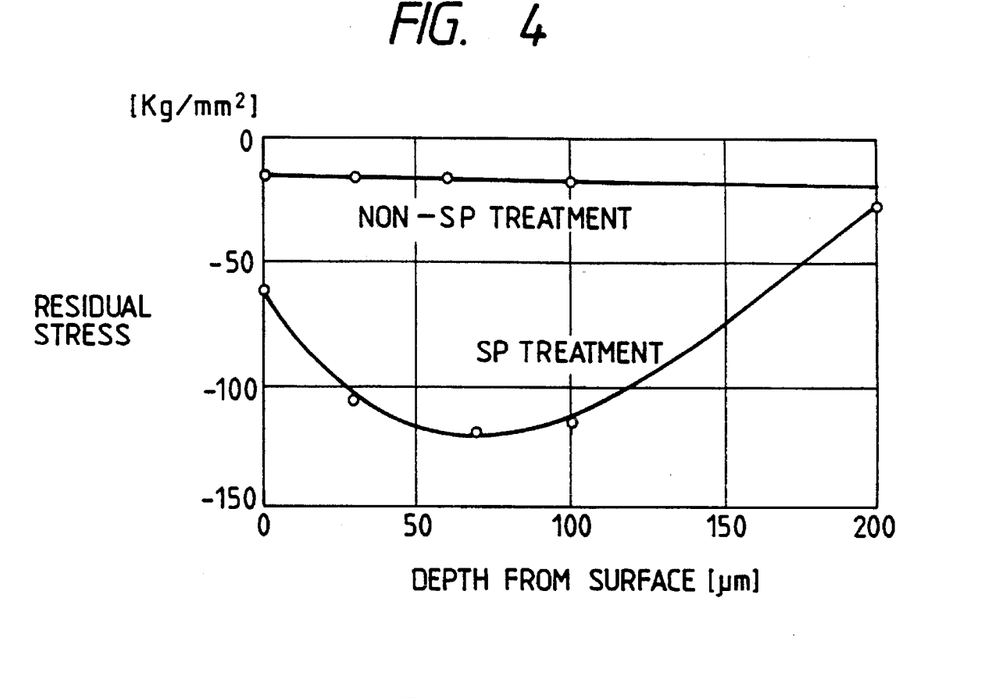
FIG. 4 is a diagram showing compressive residual stress in function of depth from the surface in non-SP treated products and SP treated products according to the first embodiment of the present invention.

It is understood from FIG. 4 that the SP-treated samples satisfy the compressive residual stress peak requirement that ranges from $-130$ to $-60$ Kgf/mm$^2$.

It is also understood from Table 5 that the examples (Material Nos. B to E) exhibit a service life of more than 100 hours even in non-SP treated products. The reason therefor is that the examples (Material Nos. B to E), whose intergranular oxide layers are thin so that stress concentration is reduced and fatigue fracture strength is thereby improved.

On the other hand, it is found that the lives of the comparative examples (Material Nos. A and B to E) whose intergranular oxide layers are thick are short. The reason therefor is that stress concentration at the intergranular oxide layer has adversely affected the fatigue fracture strength.

It is also understood that the service life of the SP-treated product has significantly been improved compared with the non-SP treated product. That is, the compressive residual stress peaks at the position within 0.15 mm in depth from the surfaces of the input and output side disks are limited to $-130$ to $-60$ Kgf/mm$^2$ by the SP process. From this it was verified that a stable improvement in service life can be achieved.

While the test through which the results shown in Table 5 was obtained was ended after 100 hours in this embodiment, the SP-treated products (Material Nos. B to E) according to the present invention exhibited a more stable long service life.

While the SP-treated products, both inventive examples (Material Nos. B to E) and comparative examples (Material No. I), exhibited a service life of more than 100 hours, the examples (Material Nos. B to E) exhibited a more stable long service life.

While the case of subjecting the input and output side disks to the SP process has been described in this embodiment, the SP process can be applied only to the portion "c" of the power roller so that the power roller can be provided with satisfactory results.

While the case of subjecting the input and output side disks and power roller to the carburizing process to obtain the above-mentioned effective carburized depths has been described in this embodiment, a carbonitriding process may substitute the carburizing process. In such a case, the following process conditions may be applied, as shown in, e.g., FIG. 5.

Carbonitriding Conditions

Atmosphere: Rx gas, enriched gas, and 5% ammonia gas

Carbonitriding temperature: Selected from a range of 830° to 870° C.

Carbonitriding time: 50 to 200 hours in accordance with the desired effective carburized depth While it has been described that the effective carburized depths and the like are defined for all the traction surfaces of the input and output side disks and power rollers in this embodiment, the present invention may be applied only to one of the traction surfaces of the input side disk and the power roller, or one of the traction surfaces of the output side disk and the power roller, depending on the operating condition.

While the dimensions of the input and output side disks and power rollers in the toroidal-type continuously variable transmission of the present invention are not particularly limited, it is optimal to apply the present invention to input and output side disks whose outer diameter is 200 $\phi$mm or less and to power rollers whose outer diameter is 120 $\phi$mm or less.

As described above, the toroidal-type continuously variable transmission of the present invention is characterized as subjecting the input side disk, the output side disk, and the power roller, which are components of the toroidal-type continuously variable transmission, to either a carburizing and grinding process or to a carbonitriding and grinding process, so that effective carburized depths of the input side disk, the output side disk, and the power rollers are limited to a range between 2.0 mm and 4.0 mm. Therefore, generation of flaking on the traction surfaces in the toroidal surface formed by the input and output side disks as well as on the traction surfaces of the power rollers can be suppressed. In addition, fatigue fracture strengths of the input and output side disks and power rollers can also be improved. As a result, a toroidal-type continuously variable transmission having a long service life can be provided.

What is claimed is:

1. A toroidal-type continuously variable transmission comprising:

an input side disk disposed on an input shaft;

an output side disk disposed on an output shaft; and a power roller for transmitting motive power of the input shaft to the output shaft while engaging both the input side disk and the output side disk, wherein the input side disk, the output side disk, and the power roller are subjected to one of a carburizing and grinding process and a carbonitriding and grinding process so that effective carburized depths of the input side disk, the output side disk, and the power roller are limited to a range between 2.0 mm and 4.0 mm.

2. The toroidal-type continuously variable transmission of claim 1, wherein a material of which the input side disk, the output side disk and the power roller are made contains: silicon within a range between 0.05 wt % and 0.2 wt %; and manganese within a range between 0.2 wt % and 0.7 wt %.

3. The toroidal-type continuously variable transmission of claim 1, wherein a peak of a residual compressive stress is limited to a range between $-130$ Kgf/mm$^2$ and $-60$ Kgf/mm$^2$ within 0.15 mm in depth from surfaces of the input side disk, the output side disk and the power roller.

4. The toroidal-type continuously variable transmission of claim 1, wherein the input side disk, the output side disk and the power roller are made of a case hardening steel containing 0.35 wt % or less of carbon.

5. The toroidal-type continuously variable transmission of claim 2, wherein each of the input side disk, the output side disk and the power roller includes a surface having a depth in which a peak of a residual compressive stress is limited to a range between −130 Kgf/mm² and −60 Kgf/mm² within 0.15 mm in depth.

6. The toroidal-type continuously variable transmission of claim 5, wherein the material includes 0.35 wt % or less of carbon.

7. The toroidal-type continuously variable transmission of claim 2, wherein the material includes 0.35 wt % or less of carbon.

8. The toroidal-type continuously variable transmission of claim 1, wherein each of the input side disk, the output side disk and the power roller includes an intergranular oxide layer of at most 10 μm in depth.

9. The toroidal-type continuously variable transmission of claim 1, wherein each of the input side disk, the output side disk and the power roller includes a surface having a Vickers hardness of HV 697 to 772 in the respective carburized depths.

\* \* \* \* \*